United States Patent
Rausch

(10) Patent No.: US 6,784,845 B1
(45) Date of Patent: Aug. 31, 2004

(54) ANTENNA SYSTEM FOR RECEIVING AND/OR TRANSMITTING SIGNALS OF MULTIPLE POLARIZATIONS

(75) Inventor: Walter F. Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 5 days.

(21) Appl. No.: 10/151,444

(22) Filed: May 20, 2002

(51) Int. Cl.[7] ................................................ H04Q 7/20
(52) U.S. Cl. ................................ 343/702; 455/277.1
(58) Field of Search .............................. 343/702, 797, 343/853, 893, 850, 857, 770, 725, 767; 455/562, 561, 273, 84, 90

(56) References Cited

U.S. PATENT DOCUMENTS

| | | | | |
|---|---|---|---|---|
| 5,402,136 A | * | 3/1995 | Goto et al. | 343/729 |
| 5,933,788 A | * | 8/1999 | Faerber et al. | 455/562 |
| 6,175,334 B1 | * | 1/2001 | Vannatta et al. | 343/702 |

\* cited by examiner

Primary Examiner—James Vannucci

(57) ABSTRACT

An antenna system for use in a communication system is provided. A first antenna is configured to receive a first signal having a first polarization. A second antenna is configured to receive a second signal having a second polarization and configured to receive a third signal having a third polarization. The second polarization is rotated from the first polarization. The third polarization is rotated from the second polarization.

27 Claims, 5 Drawing Sheets

ANTENNA SYSTEM FOR RECEIVING AND/ OR TRANSMITTING SIGNALS OF MULTIPLE POLARIZATIONS

BACKGROUND OF THE INVENTION

1. Field of the Invention

This invention relates to the field of telecommunications, and in particular to antenna systems and operational methods.

2. Description of the Prior Art

Antennas are used to receive and transmit signals that comprise electromagnetic waveforms. Electromagnetic waveforms have two distinct fields, an electric field and a magnetic field. The electric field and the magnetic field are orthogonal to one another and determine a polarization of a signal. An example of a polarization of a signal is horizontal polarization. Horizontal polarization includes an electric field that is horizontal to a receiver as the signal is being received. Antennas are configured to either receive or transmit a signal based on the polarization of the signal. In many instances, a single antenna is used to either receive or transmit an individual signal of a particular polarization.

Many signals are used in communication systems. The sheer number of signals necessitates diversity among the signals. One form of diversity includes spatial diversity. Spatial diversity includes separating antennas by some predetermined distance to assist in preventing interference from other signals. Interference can occur when a signal intended for one antenna on a platform is received by another antenna on the same platform. An example of spatial diversity includes configuring an antenna platform to have multiple antennas spaced apart from one another for receiving and/or transmitting individual signals of a single polarization. Unfortunately, providing multiple antennas is costly and increases a physical load placed on the platform. Furthermore, antenna platform space is typically limited and spatial diversity increases platform size.

SUMMARY OF THE SOLUTION

The invention helps solve the above problem and others by providing an antenna system for use in a communication system. The antenna system includes a first antenna and a second antenna The first antenna receives a signal having a first polarization. The second antenna receives a signal having a second polarization and a signal having a third polarization. The second polarization is rotated from the first polarization and the third polarization is rotated from the second polarization.

In an embodiment, the second polarization is rotated substantially forty-five degrees from the first polarization. In other embodiments, the third polarization is substantially orthogonal to the second polarization. In another embodiment, the first antenna is configured to receive a signal having a polarization that is substantially orthogonal to the first polarization. In one embodiment, the first antenna is configured to transmit a signal having the first polarization. In other embodiments, the first antenna is configured to transmit a signal having a polarization that is substantially orthogonal to the first polarization. In other embodiments, the second antenna is configured to transmit a signal having the second polarization. In another embodiment, the second antenna is configured to transmit a signal having the third polarization. In one embodiment, the antenna system includes a third antenna configured to receive a signal having the first polarization. In another embodiment, the third antenna is configured to transmit a signal having the first polarization. In other embodiments, the third antenna is configured to receive a signal having a polarization that is substantially orthogonal to the first polarization. In one embodiment, the third antenna is configured to transmit a signal having a polarization that is substantially orthogonal to the first polarization. In another embodiment, the communication system comprises a wireless broadband communication system. In one embodiment, the wireless broadband communication system comprises a Multichannel Multipoint Distribution System (MMDS). In other embodiments, the antenna system includes a platform for supporting antennas.

Advantages of the following embodiments include reducing a number of antennas for transmitting and/or receiving while preserving antenna diversity. Other advantages include decreasing a physical load placed on an antenna platform.

DESCRIPTION OF THE DRAWINGS

The same reference number represents the same element on all drawings.

DETAILED DESCRIPTION OF THE DRAWINGS

Figure 1:
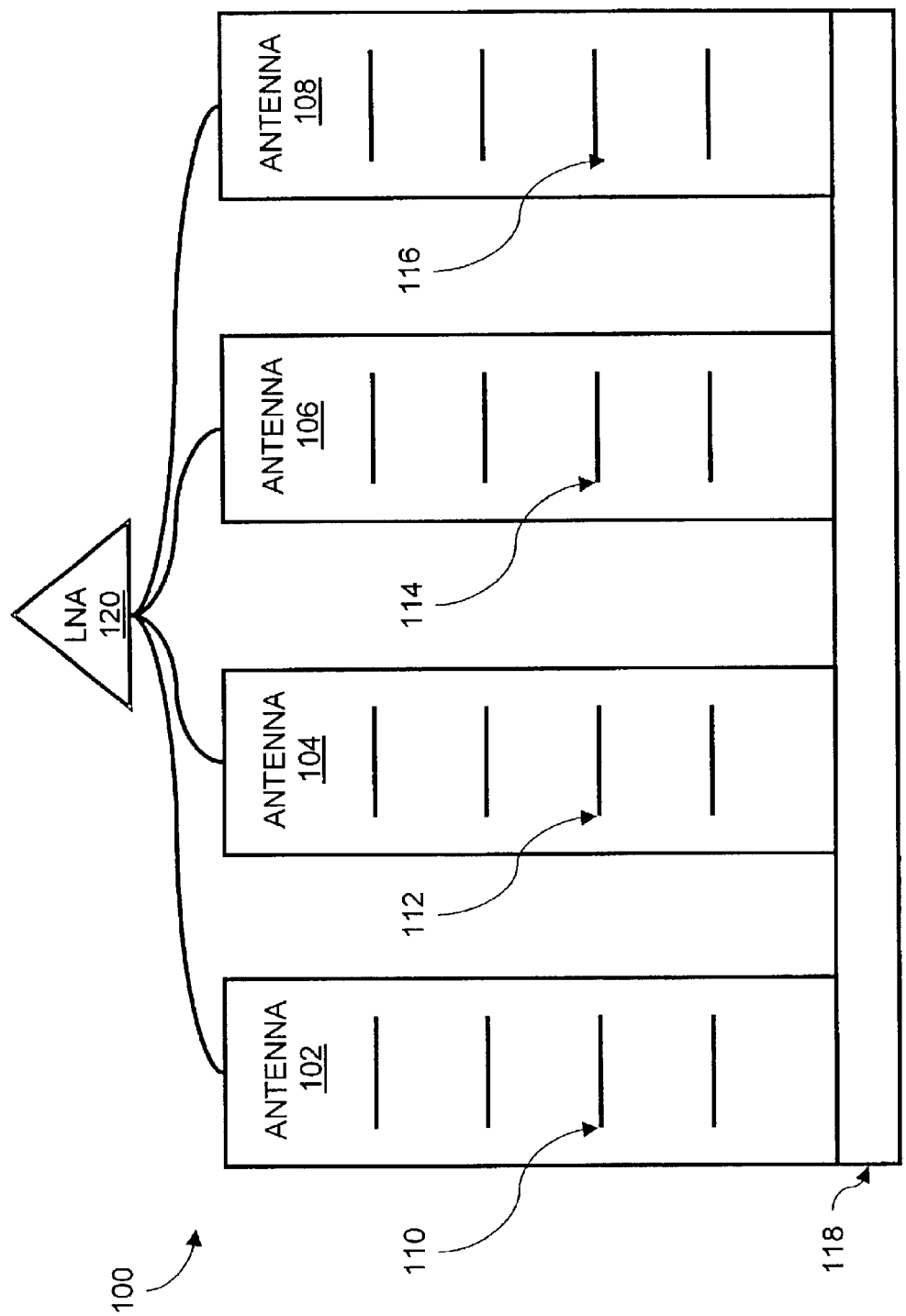
FIG. 1 illustrates an antenna system in the prior art.

Prior Art Antenna System—FIG. 1

FIG. 1 illustrates antenna system 100 in the prior art. Antenna system 100 comprises antenna 102, antenna 104, antenna 106, antenna 108, Low Noise Amplifier (LNA) 120, and platform 118. Antennas 102, 104, 106, and 108 respectively comprise elements 110, 112, 114, and 116. Antennas 102, 104, 106, and 108 are connected to LNA 120. Connections could include any wire, coaxial cable, or other means of conducting electromagnetic waveforms.

Elements include any structures of an antenna that conduct electromagnetic waveforms. Element 110 refers to all elements of antenna 102 that are configured to receive and/or transmit signals having a horizontal polarization. LNA 120 includes any circuit configured to increase a gain of a signal. LNA 120 could be a single low noise amplifier or multiple low noise amplifiers. Antennas 102, 104, 106, and 108 are mounted to platform 118. Platform 118 includes any physical structure configured to support an antenna. A signal includes any electromagnetic waveform that is either propagated from or to an antenna. Similar references are made throughout.

Figure 2:
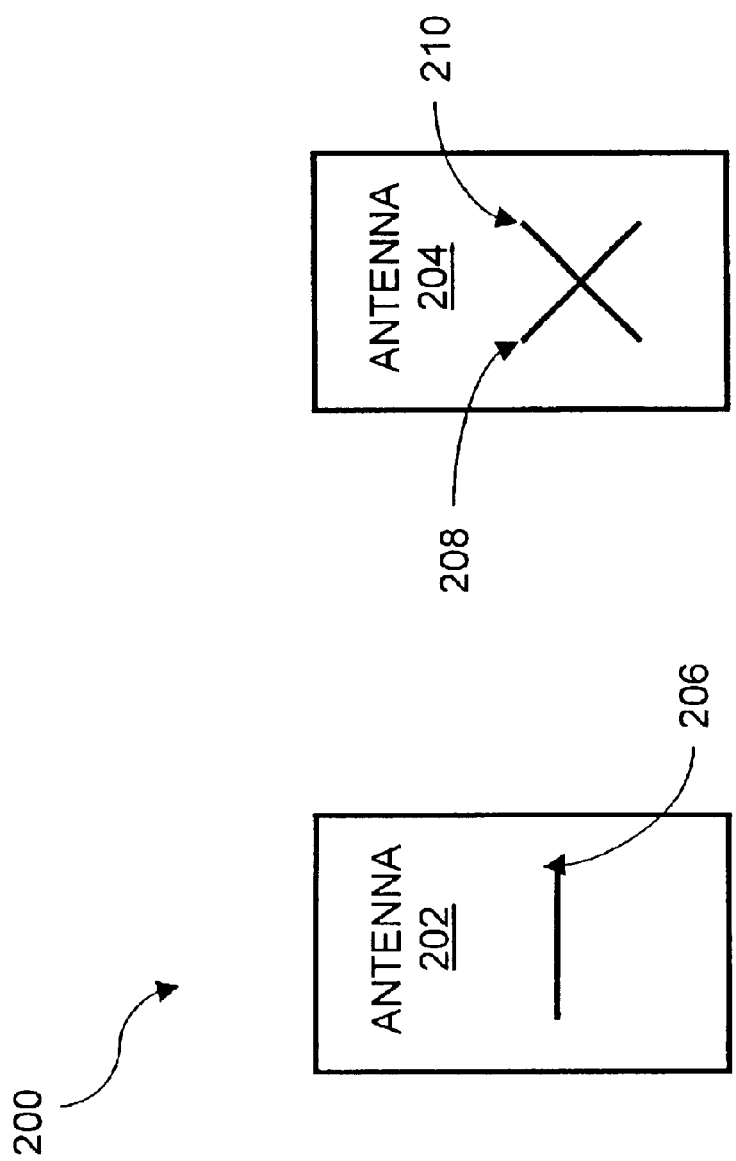
FIG. 2 illustrates an antenna system in an example of the invention.
Figure 3:
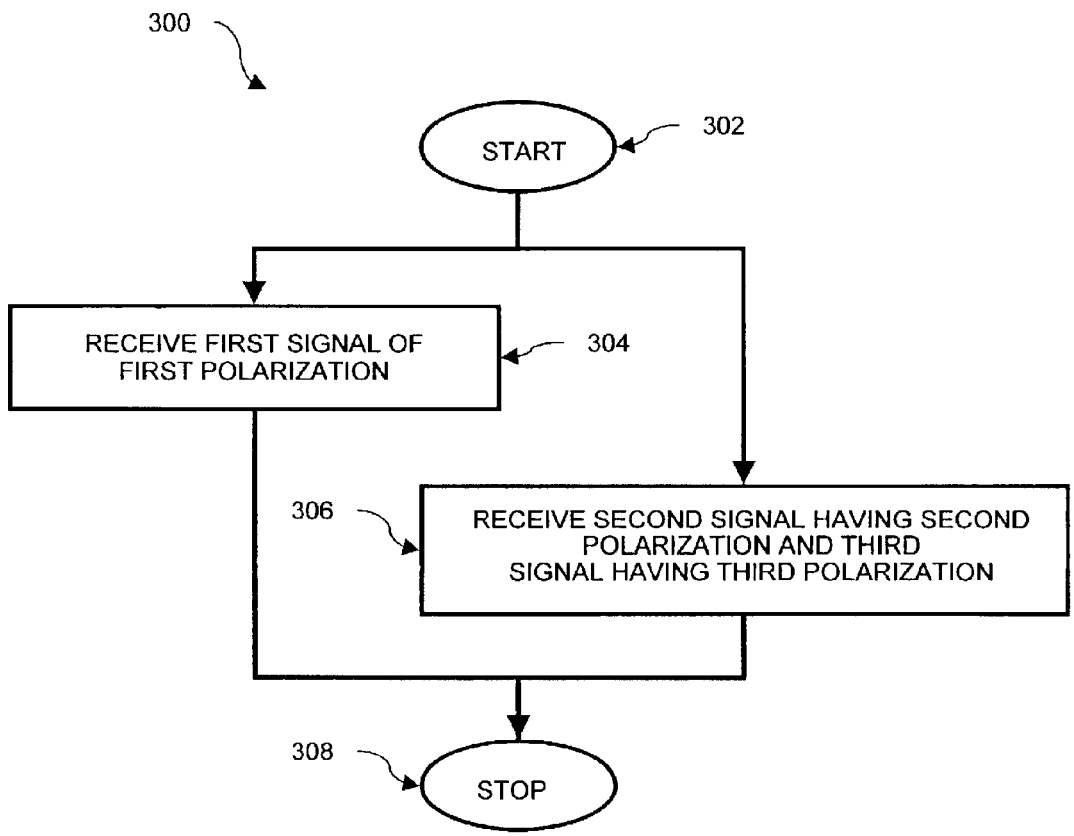
FIG. 3 illustrates the operation of the antenna system in an example of the invention.

Antenna System—FIGS. 2–3

FIG. 2 illustrates antenna system 200 in an example of the invention. Antenna system 200 comprises antenna 202 and antenna 204. Antenna 202 comprises element 206. Antenna 204 comprises element 208 and element 210.

Antenna 202 includes any antenna configured to receive a first signal having a first polarization. Antenna 204 includes any antenna configured to receive a second signal having a second polarization and configured to receive a third signal having a third polarization. The second polarization is rotated from the first polarization. The third polarization is rotated from the second polarization. Based on this disclosure, those skilled in the art will know how to make and use antenna system 200.

FIG. 3 illustrates the operation 300 of antenna system 200 in an example of the invention. Operation 300 of antenna system 200 commences in step 302. Antenna 202 receives the first signal having the first polarization in step 304. Antenna 204 receives the second signal having the second polarization and the third signal having the third polarization in step 306. Once reception is complete, the operation ends in step 308. Based on this disclosure, those skilled in the art will appreciate how to modify existing antenna systems to receive a first signal having a first polarization, a second signal having a second polarization, and a third signal having a third polarization, wherein the second polarization is rotated from the first polarization and the third polarization is rotated from the second polarization.

Figure 4:
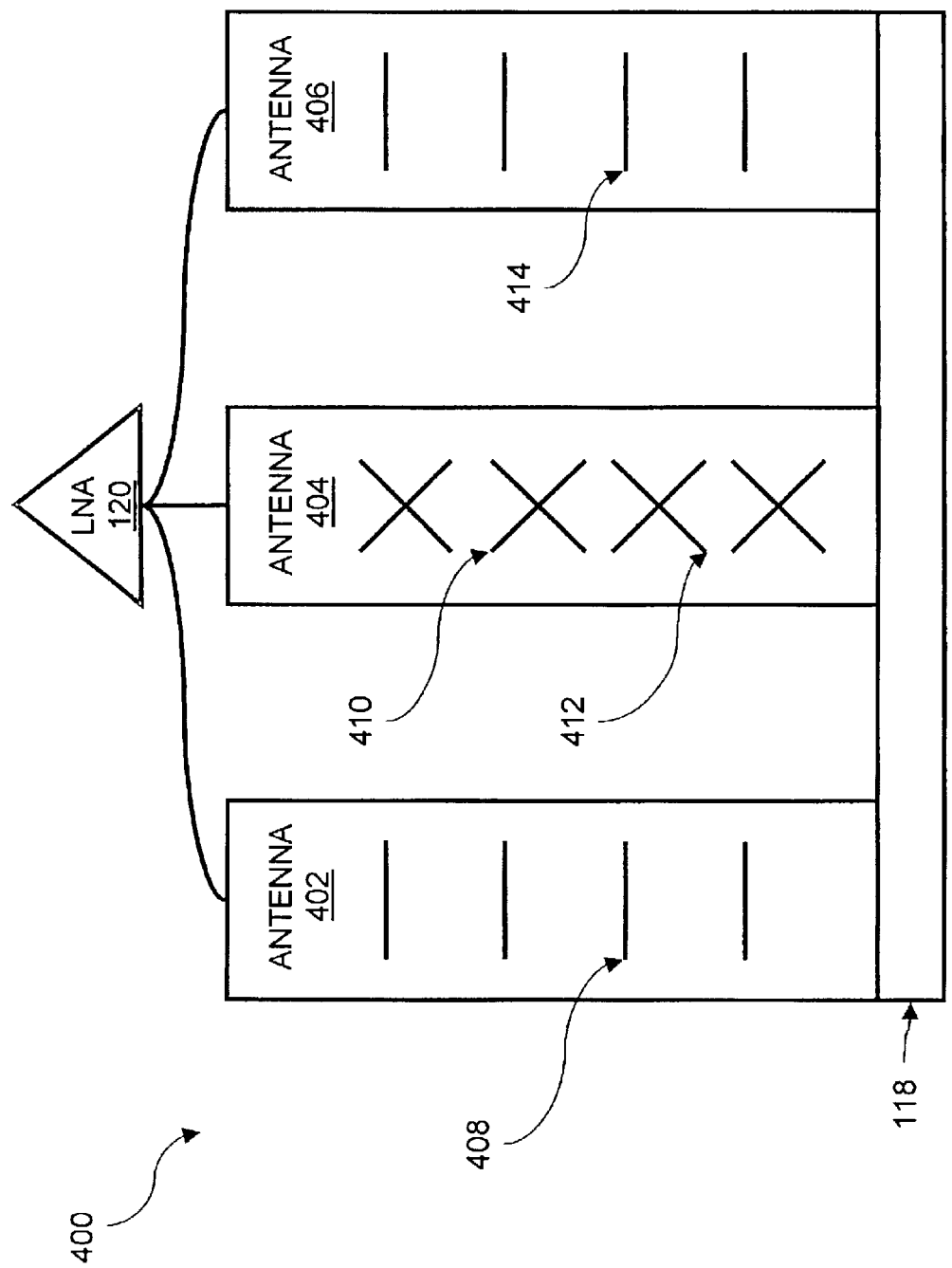
FIG. 4 illustrates an antenna system that includes three antennas in an example of the invention.
Figure 5:
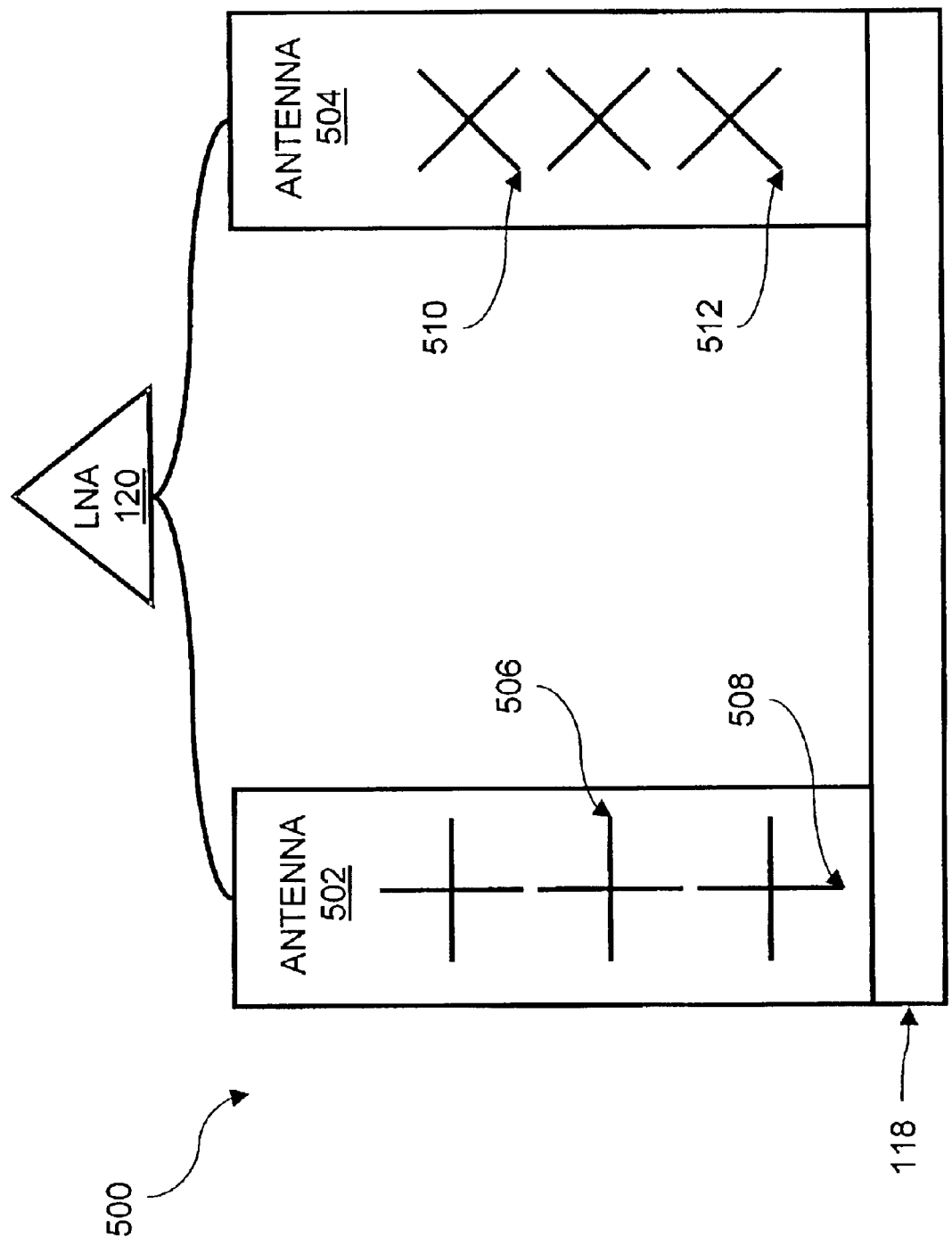
FIG. 5 illustrates an antenna system that includes two antennas in an example of the invention.

Antenna System Embodiments—FIGS. 4–5

FIGS. 4–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 4 illustrates antenna system 400 in an example of the invention. Antenna system 400 comprises antenna 402, antenna 404, antenna 406, LNA 120, and platform 118. Antenna 402 comprises elements 408. Antenna 404 comprises elements 410 and elements 412. Antenna 406 comprises elements 414. Antennas 402, 404, and 406 are connected to LNA 120. Antennas 402, 404, and 406 are mounted to platform 118.

Elements 408 of antenna 402 are configured to receive a signal having a horizontal polarization. In other embodiments, elements 408 are configured to receive a signal having a vertical polarization. Elements 410 of antenna 404 are configured to receive a signal having a polarization that is rotated substantially forty-five degrees in a clockwise rotation from a polarization of a signal received by elements 408 of antenna 402. Elements 412 of antenna 404 are configured to receive a signal having a polarization that is substantially orthogonal to a polarization of a signal received by elements 410. Elements 414 of antenna 406 are configured to receive a signal having a horizontal polarization. In other embodiments, elements 408 are configured to receive a signal having a vertical polarization.

Elements 408 of antenna 402 are also configured to transmit a signal. Polarization of a signal transmitted by elements 408 of antenna 402 is either horizontal or vertical depending on the configuration of elements 408. In some embodiments, elements 410 of antenna 404 are also configured to transmit a signal having a polarization that is rotated substantially forty-five degrees in a clockwise rotation from a polarization of a signal transmitted by elements 408 of antenna 402. In other embodiments, elements 412 of antenna 404 are also configured to transmit a signal having a polarization that is substantially orthogonal to a polarization of a signal transmitted by elements 410. Elements 414 of antenna 406 are also configured to transmit a signal. Polarization of a signal transmitted by elements 414 is either horizontal or vertical depending on the configuration of elements 414.

Receiving signals with different polarizations creates polarization diversity for the antennas. Polarization diversity of antennas allows signals to be transmitted and/or received while decreasing a dependence on spatial diversity for antennas. Polarization diversity of antennas also assists in preventing interference from other signals by allowing signals to be transmitted and/or received at different polarizations.

Antenna system 400 is configured to operate as a wireless broadband communication system. A wireless broadband communication system is generally referred to as a system that delivers 64 kilobits per second or greater. Wireless broadband communication systems can communicate over downstream channels and upstream channels. A customer receives data from another device or system over a downstream channel. The customer transmits data to another device or system over an upstream channel.

Antenna system 400 is further configured to operate as a Multichannel Multipoint Distribution System (MMDS). MMDS is a line-of-sight communication system that operates in government regulated frequency ranges.

FIG. 5 illustrates antenna system 500 in an example of the invention. Antenna system 500 comprises antenna 502, antenna 504, LNA 120, and platform 118. Antenna 502 comprises elements 506 and 508. Antenna 504 comprises elements 510 and elements 512. Antennas 502 and 504 are connected to LNA 120. Antennas 502 and 504 are mounted to platform 118. Elements 506 of antenna 502 are configured to receive a signal having a horizontal polarization. Elements 506 of antenna 502 are also configured to transmit a signal having a vertical polarization. Elements 508 of antenna 502 are configured to receive a signal having a vertical polarization. Elements 508 of antenna 502 are also configured to transmit a signal having a vertical polarization.

Elements 510 of antenna 504 are configured to receive a signal having a polarization that is rotated substantially forty-five degrees in a clockwise rotation from a polarization of a signal received by elements 506 of antenna 502. Elements 510 of antenna 504 are also configured to transmit a signal having a polarization that is rotated substantially forty-five degrees in a clockwise rotation from a polarization of a signal transmitted by elements 506 of antenna 502. Elements 512 of antenna 504 are configured to receive a signal having a polarization that is substantially orthogonal to a polarization of a signal received by elements 510. Elements 512 of antenna 504 are also configured to transmit a signal having a polarization that is substantially orthogonal to a polarization of a signal transmitted by elements 510.

Other variations of the above embodiments include altering rotations of polarizations of signals that are received and/or transmitted. For example, elements 510 can either be configured to receive a signal having an angle that is forty-five degrees from the horizontal polarization or be configured to receive a signal having some angle other than forty-five degrees from the horizontal polarization. In another example, the horizontal and vertical polarizations can also be rotated to receive signals having angles other than horizontal or vertical. There are numerous combinations of receiving signals from different polarizations that provide polarization diversity. However, polarization diversity is limited by interference between adjacent signals.

Advantages of the above embodiments include reducing a number of antennas for transmitting and/or receiving while preserving antenna diversity. Other advantages include decreasing a physical load placed on an antenna platform.

I claim:

1. An antenna system for use in a communication system, the antenna system comprising:
   a first antenna configured to receive a first signal having a first polarization; and
   a second antenna configured to receive a second signal having a second polarization and configured to receive a third signal having a third polarization, wherein the second polarization is rotated from the first polarization, and wherein the polarization is rotated from the second polarization by being substantiating orthogonal to the second polarization.

2. The antenna system of claim 1 wherein the second polarization is rotated substantially forty-five degrees from the first polarization in a clockwise rotation.

3. The antenna system of claim 1 wherein the second antenna is further configured to transmit a fourth signal having the second polarization.

4. The antenna system of claim 1 wherein the second antenna is further configured to transmit a fourth signal having the third polarization.

5. The antenna system of claim 1 wherein the first antenna is further configured to receive a fourth sign having a fourth polarization that is substantially orthogonal to the first polarization.

6. The antenna system of claim 1 wherein the first antenna is further configured to transmit a fourth signal having the first polarization.

7. The antenna system of claim 5 wherein the first antenna is further configured to transmit a fifth signal having the fourth polarization.

8. The antenna system of claim 1 further comprises a third antenna configured to receive a fourth signal having the first polarization.

9. The antenna system of claim 1 further comprises a platform configured to support the first antenna and the second antenna.

10. The antenna system of claim 8 wherein the third antenna is further configured to receive a fifth signal having a fourth polarization that is substantially orthogonal to the first polarization.

11. The antenna system of claim 10 wherein the third antenna is further configured to transmit a sixth signal having the first polarization.

12. The antenna system of claim 10 wherein the third antenna is further configured to transmit a sixth signal having the fourth polarization.

13. The antenna system of claim 10 wherein the communication system comprises a wireless broadband communication system.

14. The antenna system of claim 13 wherein the wireless broadband communication system comprises a Multichannel Multipoint Distribution System (MMDS).

15. A method of operating an antenna system in a communication system, the method comprising:
   receiving a first signal having a first polarization into a first antenna; and
   receiving a second signal having a second polarization and a third signal having a third polarization into a second antenna, wherein the second polarization is rotated from the first polarization, and wherein the third polarization is rotated from the second polarization by being substantially orthogonal to the second polarization.

16. The method of claim 15 wherein the second polarization is rotated substantially forty-five degrees from the first polarization in a clockwise rotation.

17. The method of claim 15 further comprising transmitting a fourth signal having the second polarization.

18. The method of claim 15 further comprising transmitting a fourth signal having the third polarization.

19. The method of claim 15 further comprising receiving a fourth signal having a fourth polarization that is substantially orthogonal to the first polarization.

20. The method of claim 19 further comprising transmitting a fifth signal having the first polarization.

21. The method of claim 19 further comprising transmitting a fifth signal having the fourth polarization.

22. The method of claim 15 further comprising receiving a fourth signal having the first polarization.

23. The method of claim 22 further comprising receiving a fifth signal having a fourth polarization that is substantially orthogonal to the first polarization.

24. The method of claim 23 further comprising transmitting a sixth signal having the first polarization.

25. The method of claim 23 further comprising transmitting a sixth signal having the fourth polarization.

26. The method of claim 15 wherein the communication system comprises a wireless broadband communication system.

27. The method of claim 26 wherein the wireless broadband communication system comprises a Multichannel Multipoint Distribution System (MMDS).

* * * * *